United States Patent [19]

Anderson

[11] Patent Number: 5,083,427
[45] Date of Patent: Jan. 28, 1992

[54] APPARATUS AND METHOD TO REDUCE AUTOMOTIVE EMISSIONS USING FILTER CATALYST INTERACTIVE WITH UEGO

[75] Inventor: Michael J. Anderson, Canton, Mich.

[73] Assignee: Ford Motor Company, Dearborn, Mich.

[21] Appl. No.: 478,398

[22] Filed: Feb. 12, 1990

[51] Int. Cl.⁵ .................................................. F01N 3/20
[52] U.S. Cl. ...................................... 60/274; 60/276; 60/285
[58] Field of Search .......................... 60/274, 276, 285

[56] References Cited

U.S. PATENT DOCUMENTS

| 3,939,654 | 2/1976 | Creps . | |
|---|---|---|---|
| 3,961,477 | 6/1976 | Grieshaber et al. . | |
| 4,000,614 | 1/1977 | Abthoff et al. . | |
| 4,251,990 | 2/1981 | Norimatsu et al. . | |
| 4,253,302 | 3/1981 | Asano | 60/276 |
| 4,272,329 | 9/1981 | Hetrick et al. . | |
| 4,362,605 | 12/1982 | Bozon | 60/276 |
| 4,719,895 | 1/1988 | Mieno | 60/276 |
| 4,761,950 | 8/1988 | Nagai et al. . | |
| 4,841,934 | 6/1989 | Logothetis | 123/440 |

FOREIGN PATENT DOCUMENTS

| 39027 | 3/1977 | Japan | 60/276 |
|---|---|---|---|
| 5314 | 1/1978 | Japan | 60/276 |

OTHER PUBLICATIONS

Murase et al, "A Portable Fast Response Air-Fuel Ratio Meter Using An Extended Range Oxygen Sensor", SAE #880559, 2/29/88.
Ishii et al, "Wide Range Air-Fuel Ratio Control System", SAE #880134, 2/29/88.
Ueno et al., "Wide-Range Air-Fuel Ratio Sensor", SAE #860409. 1986.
Suzuki et al, "Air-Fuel Ratio Sensor for Rich, Stoichiometric and Lean Ranges", SAE #860,408, 1986.

Primary Examiner—Douglas Hart
Attorney, Agent, or Firm—Joseph W. Malleck; Roger L. May

[57] ABSTRACT

Apparatus system to control unwanted automotive emissions by use of a closed loop feedback system between an engine and catalyst, the system providing a feedback response time of less than 60 milliseconds and a resolution control for maintaining A/F ratio within ±0.01–0.02% of stoichiometry irrespective of random combustion effects, variations in fuel injection, variations in intake air, variations in cylinder-to-cylinder conditions, and variations in exhaust turbulence. The system has: a low mass, three-way filter catalyst stationed close to the source of the stream and effective to filter out random combustion effects within the stream; a high mass, three-way main catalyst stationed downstream of the filter catalyst and effective to convert the remainder of noxious emissions in the stream to desired levels; (c) a continuous universal exhaust gas sensor stationed in the stream between said catalyst effective to rapidly and accurately indicate the level of oxygen within the stream leaving the filter catalyst; and (d) proportional, integral control means for adjusting in a closed loop the A/F of the mixture in response to a deviation of the sensed oxygen level from stoichiometry. The exhaust gas oxygen sensor is interactively related to the filter catalyst in time response to eliminate chemical noise, slow sensor response, and compensate for aging.

31 Claims, 5 Drawing Sheets

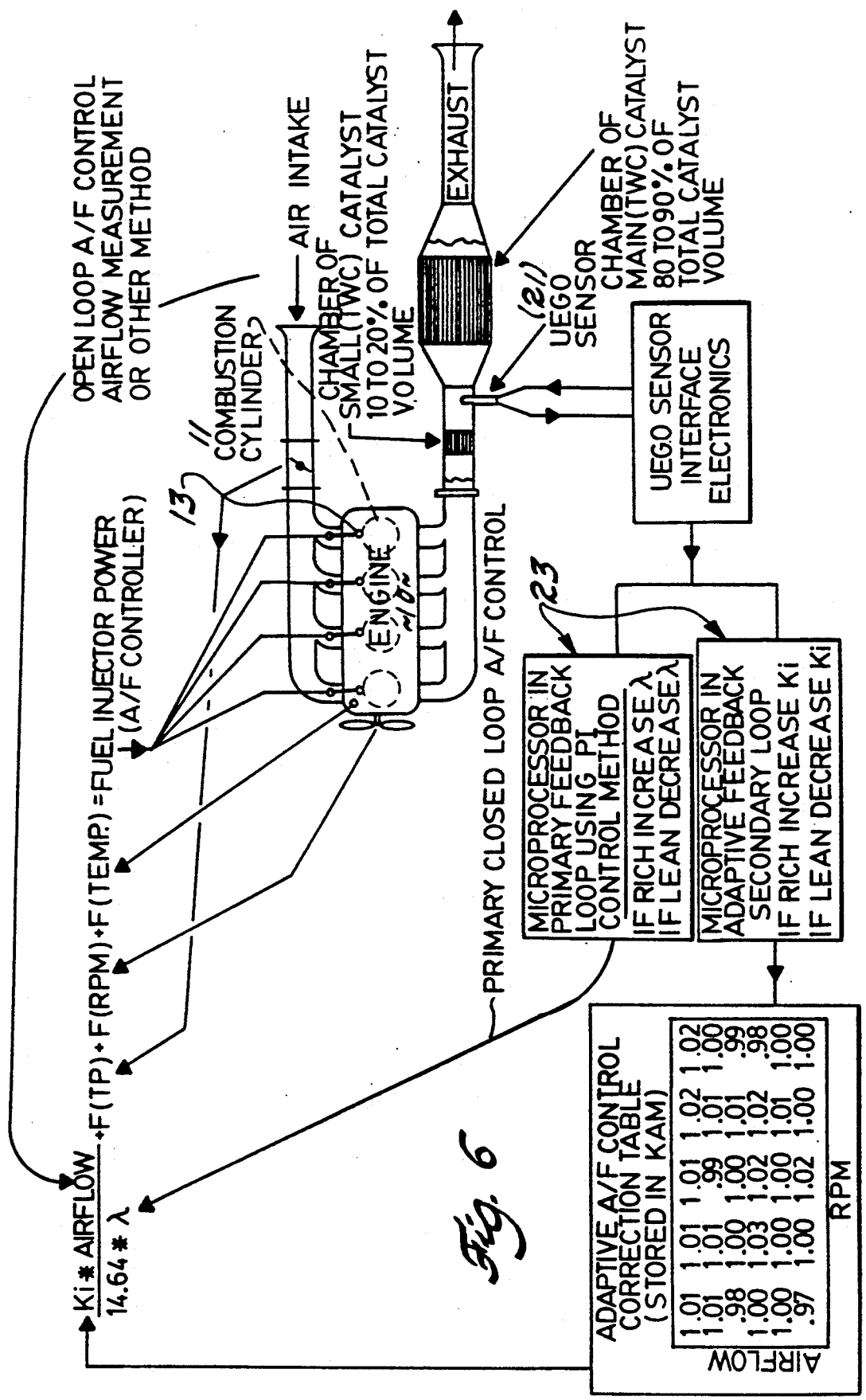

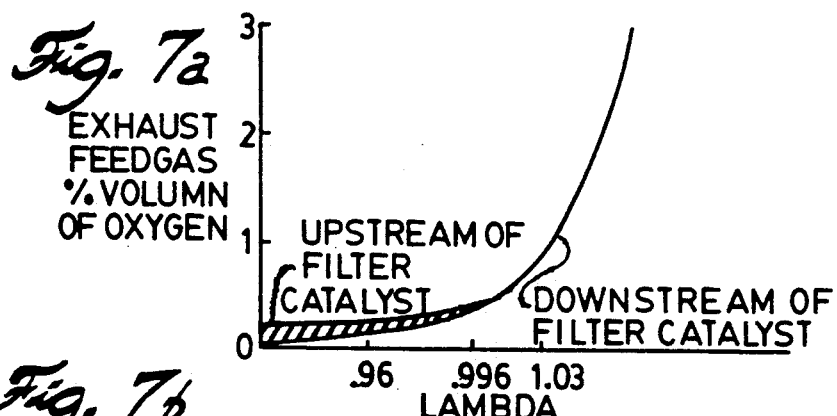
Fig. 7a EXHAUST FEEDGAS % VOLUMN OF OXYGEN
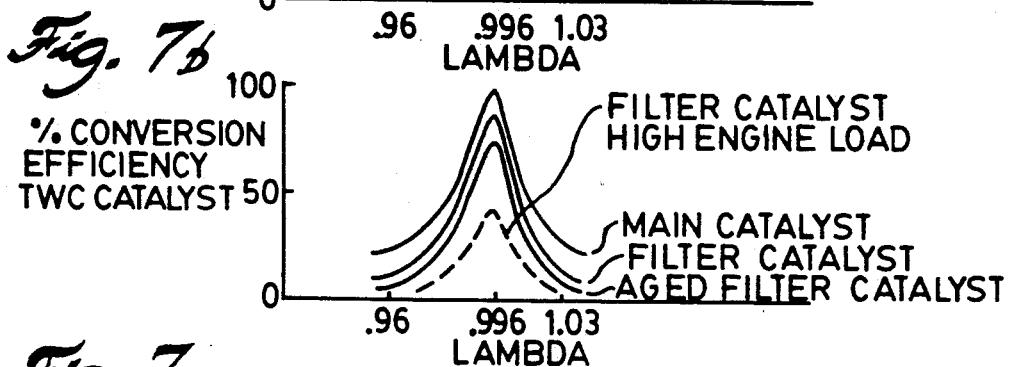
Fig. 7b % CONVERSION EFFICIENCY TWC CATALYST
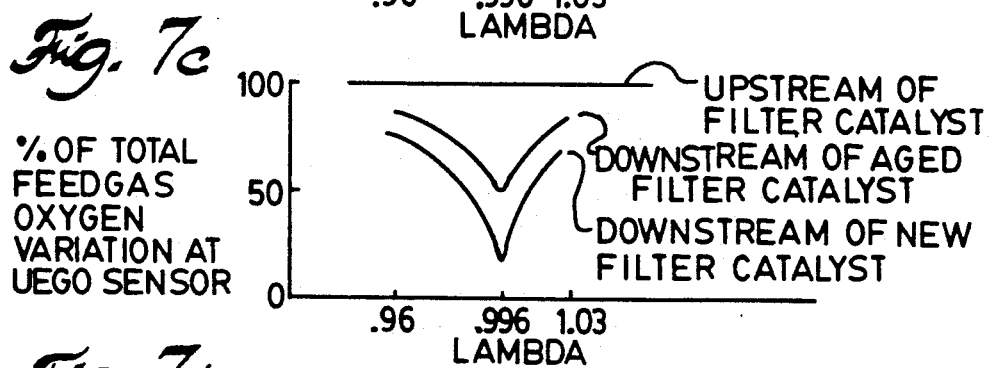
Fig. 7c % OF TOTAL FEEDGAS OXYGEN VARIATION AT UEGO SENSOR
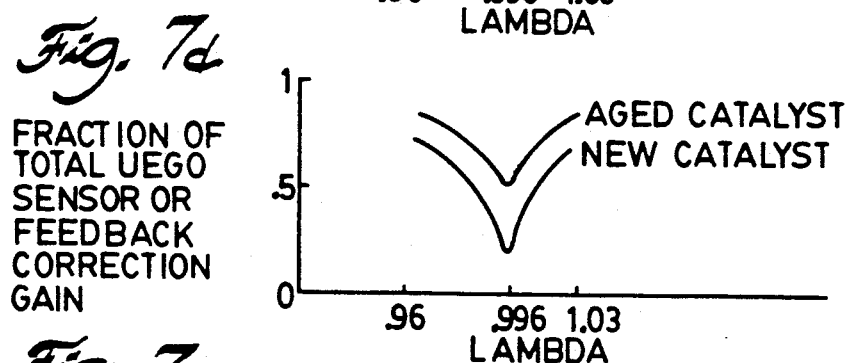
Fig. 7d FRACTION OF TOTAL UEGO SENSOR OR FEEDBACK CORRECTION GAIN
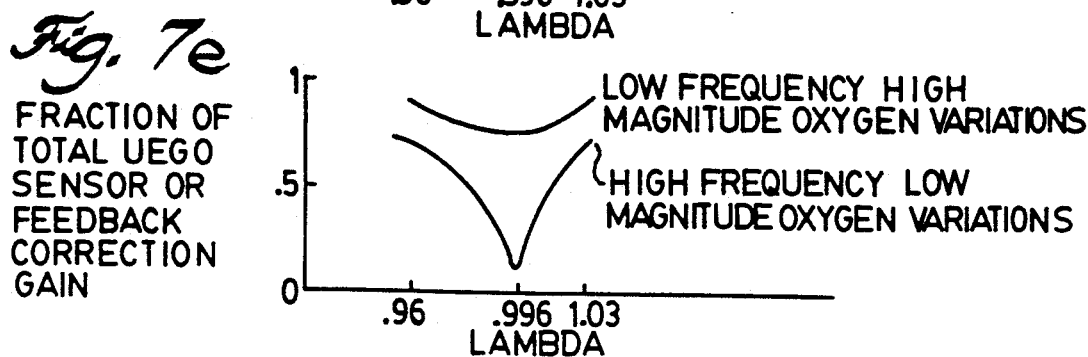
Fig. 7e FRACTION OF TOTAL UEGO SENSOR OR FEEDBACK CORRECTION GAIN

APPARATUS AND METHOD TO REDUCE AUTOMOTIVE EMISSIONS USING FILTER CATALYST INTERACTIVE WITH UEGO

BACKGROUND OF THE INVENTION

1. Technical Field

This invention relates to apparatus and methods for purifying automotive engine emissions, and more particularly to such apparatus and methods which concurrently use catalysis and air/fuel ratio feedback to maximize purification.

2. Description of the Prior Art

To improve the conversion efficiency of a catalyst system, the prior art has followed essentially two paths: (i) change the chemical or physical arrangement of catalyst elements within the conversion chamber, or (ii) modify the gaseous emissions delivered to the catalyst conversion chamber. With respect to changing the catalyst elements, the prior art has commercially evolved a three-way catalyst (that which converts HC, CO and $NO_x$) by use of a combination of precious metals coated onto a stabilized alumina substrate which in turn is carried on a monolithic ceramic cellular core. The core is engineered to pass emissions therethrough along a straight, uninterrupted axial flow at various space velocities. Such catalyst construction cannot, by itself, overcome conversion deficiencies due to random and statistically unpredictable oxygen level deviations (chemical noise) as well as statistically predictable deviations of the oxygen levels (transient excursions) which may occur, particularly during warm-up and cold-start of the engine. Chemical noise in the exhaust gas is due to mixing of turbulent rich and lean eddy currents that result respectively from variable cylinder exhaust gases and incomplete cylinder burns. Combustion explosions inherently vary from cylinder to cylinder due to different burn rates and different pulsing waves. The variation is compounded by the different lengths of exhaust ports leading to the mixing of the exhaust gases into a common stream. Chemical noise deviations cannot be predicted and do inhibit ideal oxygen level control. Transient excursions denote a temporary real change from an average oxygen level due to inadequate combustion control and should be accurately sensed for compensation. Transient excursions are not considered random and are predictable.

With respect to modifying the delivered emission gas, the prior art has found that the closer the combustion air/fuel (A/F) ratio in the engine is to stoichiometry, the lower will be the volume of noxious elements (HC, CO, $NO_x$) delivered to the catalyst chamber for conversion. Although A/F ratio feedback systems have been deployed, transient and random combustion effects still prevail preventing the catalysts from achieving advanced levels of conversion efficiencies so necessary to anticipated mandated federal levels. Even small A/F measurement inaccuracies or small time delays in sensor detection and feedback result in hunting of the A/F adjustment and inability to achieve anticipated mandated federal levels for 1994 (gm/mi at between 75,000-100,000 miles of vehicle use) of 0.25-31 HC, 3.4-4.2 CO, 0.4 $NO_x$, and 0.29-0.36 total hydrocarbons (THC). Moreover, such random effects are progressively exaggerated by aging of the catalyst and feedback system with time preventing the system from achieving anticipated federal long-life requirements beginning in years 2002 and beyond (at 100,000 miles) which may be essentially reduced to half of the anticipated 1994 requirements.

This invention has found dramatic improvement by uniquely combining a low mass, highly loaded filter catalyst upstream of a linear, wide-range, universal exhaust gas oxygen (UEGO) sensor in a feedback control loop with an A/F ratio modifier; such combination treats the exhaust gas before it enters a main conversion catalyst. Applicant is unaware of any prior art that (a) contemplates use of filter catalysts (those capable of filtering out random combustion effects or chemical noise) while converting usually only a minor amount of the noxious emissions from a moving vehicle; (b) uses a single UEGO sensor upstream of the main catalyst and downstream of the filtering catalyst; and (c) deploys automatic compensation for degradation of either the catalyst or sensor with time.

The first design of a basic nonswitching exhaust gas sensor, necessary to this invention, first appeared about 1981 with the issuance of the Hetrick U.S. Pat. No. 4,272,329 (assigned to Ford Motor Company). This patent describes a multiple-cell oxygen sensor that is more useful for meeting tighter emission standards. The sensor of this patent provides a linearized output that measures more accurately a wider range of A/F ratio while being substantially temperature insensitive to avoid thermally induced inaccuracies. Papers published during 1986 and 1988 show the acceptance in the technical community of such UEGO sensor when applied to an extended range of A/F ratios using a closed loop feedback system (closed loop being used herein to mean a controlled quantity as measured and compared to a standard representing desired performance). Such articles include: (1) I. Murase, A. Moriyama, and M. Nakai, "A Portable Fast Response Air-Fuel Ratio Meter Using An Extended Range Oxygen Sensor", SAE Paper 880559, Feb. 29, 1988; (2) J. Ishii, M. Amano, T. Yamauchi, and N. Kurihara, "Wide-Range Air-Fuel Ratio Control System", SAE Paper 880134, Feb. 29, 1988; (3) S. Ueno, N. Ichikawa, S. Suzuki and K. Terakado, "Wide-Range Air-Fuel Ratio Sensor, SAE Paper 860409, 1986; and (4) S. Suzuki, T. Sasayama, M. Miki, M. Ohsuga and S. Tanaka, "Air-Fuel Ratio Sensor For Rich, Stoichiometric and Lean Ranges", SAE Paper 860408, 1986.

What the design evolution of such UEGO sensor lacks is how to use it in a system to realize its accuracy potential. Applications of more primitive exhaust gas sensors (switching sensors) in the prior art have used (a) a single switching sensor with one or two catalyst bodies, or (b) dual switching sensors with one or two catalyst bodies. Switching sensors have a very steep change in signal at or about stoichiometry.

A single switch-type exhaust gas sensor in an upstream position relative to the catalyst body was used in U.S. Pat. No. 4,000,614 (1977). The sensor was placed in a feedback control loop and was only able to achieve A/F ratio control accuracies within ±1-2% of stoichiometry. This poor range of tolerance for A/F ratio is characteristic of excessive hunting and overcorrecting by the oxygen sensor due in part to its placement and in part to the employment of a switchpoint type sensor, characteristic of the sensors used during the 1970's.

An attempt was made in U.S. Pat. No. 3,961,477 (1976) to place the exhaust gas sensor between two catalyst bodies, the upstream body being an oxidation catalyst and the downstream body being a reducing catalyst. This patent is also an early example of closed loop A/F ratio control for catalysis and is representative of one of the most effective concepts of the 1970's. The A/F ratio tolerance capability is poor due in part to the use of a switchpoint-type exhaust gas sensor and the use of air injection immediately upstream of the sensor which detracts from its ability to accurately sense the oxygen content of the emissions. This reference does not describe the catalyst with respect to loading or effectiveness.

Use of more than one exhaust gas sensor is included in U.S. Pat. Nos. 3,939,654; 4,251,990; and 4,761,950. In the '654 patent (1976), step function (switch-type) oxygen sensors were placed upstream and downstream of a catalyst body while using a closed loop feedback system to a fuel injector for the engine. This patent properly cites problems with response time and accuracy for the oxygen sensors and attributes some of the problems to the catalyst itself, regardless of the type used. A comparator and an integrator were used to obtain control of the A/F ratio feedback control loop. Although long-term accuracy is increased somewhat from a single switchpoint sensor, accuracy was not improved much below ±1%.

In patent '990 (1981), dual sensors are used; an exhaust gas sensor is placed upstream of two catalysts in series. Again, switchpoint exhaust gas sensors are used accompanied by transient A/F ratio control inaccuracies and by time delay of compared signals leading to continued hunting and poor response.

The '950 patent (1988), employs software (see jumpback control algorithm in FIG. 4D) which uses downstream sensor information to modify an upstream sensor placed about a single catalytic body and then compares the information for control purposes. Again, the sensors are of the switchpoint-type and the system suffers from A/F ratio control accuracy problems and comparator delay.

None of the above patented prior art improves the cycle response time of the sensors within a system or independently thereof.

SUMMARY OF THE INVENTION

It is a primary object of this invention to control unwanted emissions to unprecedented lower levels by improving a closed loop A/F ratio feedback system between an engine and catalyst, the system providing superior feedback response at frequencies of 3-6 Hz for the loop and a sensor that responds within a time period of less than 60 milliseconds, and providing a resolution control for maintaining A/F ratio within ±0.01-0.02% of stoichiometry irrespective of random combustion effects, variations in fuel injection, variations in intake air, variations in cylinder-to-cylinder conditions, and variations in exhaust turbulence.

The invention to meet such goal is a system comprising: a low mass, low volume, three-way filter catalyst stationed close to the source of the stream and effective to filter out random combustion effects within the stream; a high mass, three-way main catalyst stationed downstream of the filter catalyst and effective to convert the remainder of noxious emissions in the stream to desired levels; a continuous universal exhaust gas sensor stationed in the stream between said catalysts effective to rapidly and accurately indicate the level of oxygen within the stream leaving the filter catalyst; and proportional control means for adjusting in a closed loop the A/F ratio of the mixture in response to a deviation of the sensed oxygen level from a target level.

The UEGO sensor is interactively related to the filter catalyst in time response to eliminate chemical noise and change A/F ratio feedback loop gain to compensate for aging. This interaction is provided by placing the UEGO sensor downstream of the filter catalyst, limiting the conversion efficiency of the filter catalyst, and arranging the interactive relationship between the sensor and an A/F ratio controller, affecting the injection of fuel and thus the filter catalyst, to be highly improved in response capability. Such interaction ensures that the sensor operates complementary and opposite to the sensitivity of the filter catalyst to achieve chemical noise elimination.

Preferably, low mass means less than 500 grams and low volume means less than 20 in$^3$; high mass means greater than 1000 grams and high volume means greater than 40 in$^3$; filter catalyst means a catalyst having predetermined limited conversion efficiency, i.e., 40–60% efficiency under non-idle conditions of the engine with only up to 80–85% efficiency at idle conditions at an idle space velocity of 20K/hr. Preferably, the filter catalyst is heavily loaded (i.e., 40–60 gm/ft$^3$ of precious metal) and is 2–4 inches in length and about 16–20 in$^3$ in volume. Preferably, the filter catalyst is located within a distance of 1–4 inches of the source of a unitary exhaust stream and will provide 10–20% of the total catalyst capacity.

With respect to the UEGO sensor, downstream stationing means downward along the direction of flow; wide-range means universal for accurately measuring A/F ratio at rich, lean, or about stoichiometry conditions.

Advantageously, the sensor is constructed to have two or more cells (i.e., pumping and reference cells) to achieve continuous linear output characteristics and symmetrical (above or below stoichiometry) time response. Such sensor preferably has a spinel layer removed from the electrodes while utilizing a thin wall diffusion path provided by a porous layer over the diffusion cavity. The sensor has sensing elements with a low mass of less than five grams and preferably uses four enclosed electrodes with the sensor having a frequency response of less than 60 milliseconds. Such linearized sensor will have a performance characterized by ±3% accuracy (of operating point) at lambdas of 0.7 and 1.4, with increasing accuracy toward lambda of 1 where it will be no more than ±0.07%; lambda means the ratio of actual A/F to stoichiometric A/F.

The main catalyst is stationed preferably about four inches from the upstream filter catalyst and is loaded to convert up to 90% of the emissions at a space velocity of 400K/hr at a heavy engine load.

The method mode of this invention for compensating chemical aging of a catalyst system, comprised of two in-line catalysts and a linearized UEGO sensor interposed between such catalysts, the upstream catalyst being loaded to effect limited conversion of the noxious emissions and to filter out random combustion effects of the emissions and changes in voltage of the sensor being used to control the A/F mixture at or in a desired range, comprises the steps of: (a) empirically establishing the chemical degradation rate of the upstream catalyst with a predetermined type of usage that progressively reduces conversion efficiency and permits greater gaseous noxious emissions to pass therethrough; (b) empirically establishing the degradation rate of the sensor with normal usage that progressively provides slower response and reduces the gain of the sensor; (c) establishing an initial gain characteristic for the feedback control loop based on the empirically established rate of degradation so that as the sensor ages, its loss in gain characteristic will offset the increase in passage of noxious gaseous effects through the upstream catalyst as a result of degradation thereby maintaining a uniform loop response and a level conversion of the gaseous emissions from the downstream catalyst.

Preferably, the gain of said feedback control loop is set at 20% below that needed for normal sensing. The design of the sensor should provide for a higher frequency response capability than needed for maximum efficiency of an aged catalyst.

SUMMARY OF THE DRAWINGS

FIG. 6 is a schematic control diagram for the system of this invention; and

FIGS. 7a–7e is a series of graphical representations of data depicting closed feedback control loop operation for this invention.

DETAILED DESCRIPTION AND BEST MODE

One of the main goals of this invention is to improve an interactive catalyst-fuel injector feedback system that will achieve unprecedented tight control of mean A/F ratio within a resolution of ±0.01–0.02% of stoichiometry in real time, such as within a response time of less than 60 milliseconds. It is also a goal of this invention to compensate for degradation of the catalyst body or fuel system control over time that effects such accurate resolution and quickness of response. It is desired to achieve such goals in spite of variables of engine characteristics and degradation of the catalyst bodies or fuel system over time that effect such accurate resolution and quickness of response. Such goals are achieved herein by a unique interactive combination of a small mass-volume filter catalyst and a linear, wide-range, multiple-cell, low mass exhaust gas oxygen sensor that is isolated from contamination and ambient temperature, the combination being positioned upstream of a conventional three-way catalyst body.

Figure 1:
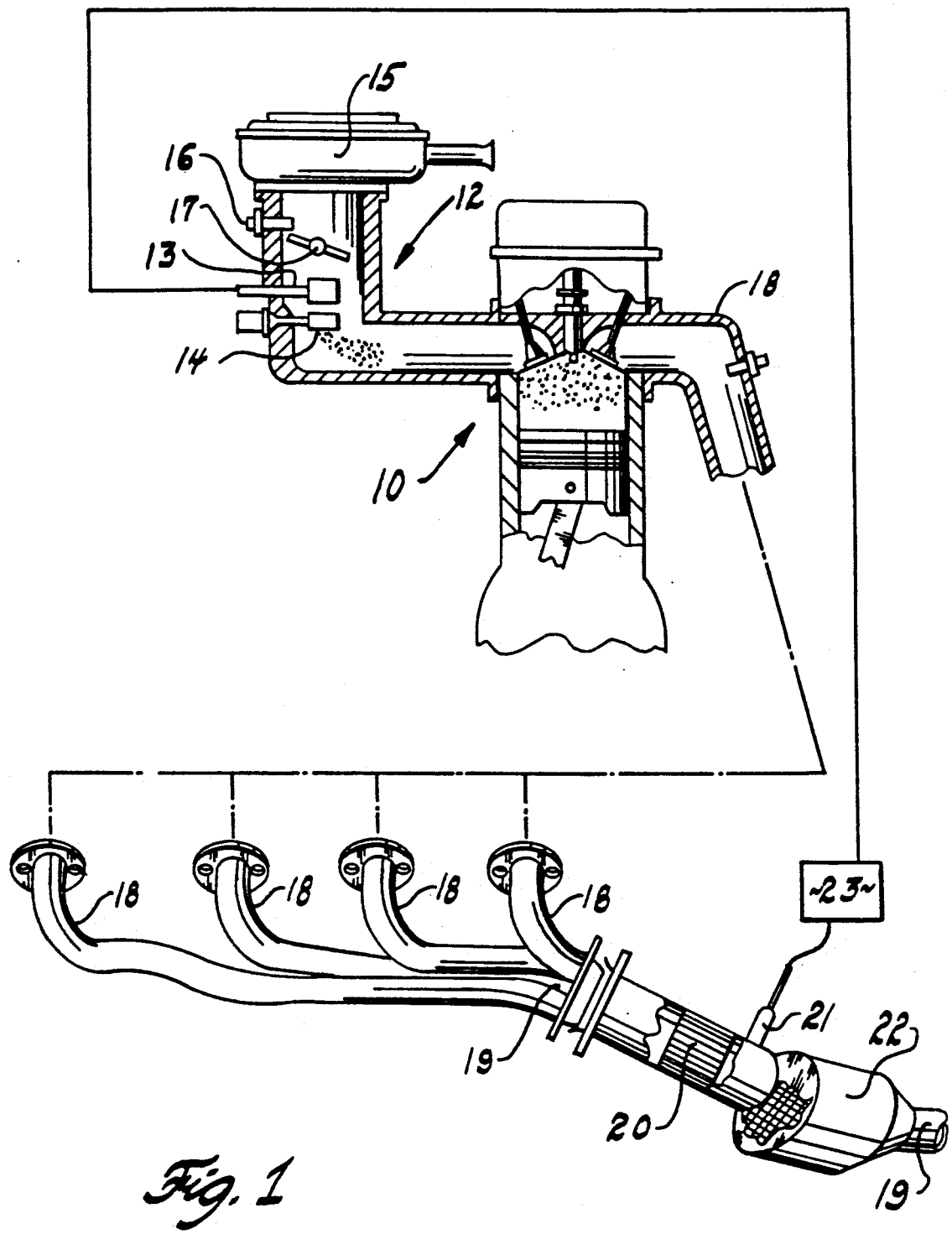
FIG. 1 is a composite view of a sectional elevational view of an engine and a perspective view of the exhaust manifold and catalyst bodies and interactive controls for this invention.

As shown in FIG. 1, the essential elements of a system for cleansing the gaseous emissions generated by the combustion within an internal combustion engine includes: an engine 10 having a combustion chamber 11 and an A/F supply 12 comprising an air intake 15, an air throttle 17, an A/F meter 16, and a single point fuel injector 13; an ultrasonic fuel atomizer 14 may be used in some instances. Exhaust channels 18, from each of the combustion cylinders or chambers 11, lead and merge into a common exhaust stream 19. Interposed in the exhaust stream 19 is a low mass-volume filter catalyst 20 located close to the point at which the exhaust channels merge into a common stream. A wide-range universal exhaust gas oxygen (UEGO) sensor 21 is located immediately downstream of the filter catalyst, and a main catalyst 22 is located downstream of the sensor 21. Interactive controls 23 in part are integral with the exhaust gas sensor construction and in part link sensor 21 with the fuel injector 13 and other engine parameters in a closed loop feedback system.

Filter Catalyst

The filter catalyst 20 must be stationed in the emission stream with care and be structured to have a low mass-volume, three-way capability to filter out random combustion effects within the stream. Random combustion effects appear as turbulent rich and lean eddy currents contributed by the varying conditions of each individual combustion cylinder; the eddy currents represent a mixture of regular completed cylinder exhaust and incomplete cylinder combustion effects. The eddy currents are random. To operate as a filter and light-off catalyst, the catalyst 20 should have a low mass of about 300–500 grams and a low volume of about 15–20 in$^3$, which together will desirably filter frequencies higher than 10 Hz. The filter catalyst should have a length which is relatively short, about 2–4 inches, if the cross-sectional configuration is circular. The filter catalyst should be designed to have a high space velocity (i.e., at least 50K/hr at engine idle and at least 350K/hr at wide-open throttle). The filter catalyst will represent only 10–20% of the total catalyst volume for the entire system (filter and main catalysts). Such catalyst may be supported on a monolithic structure having a cellular density of 200–400 cells per square inch, or may be a wire mesh support.

The ceramic cellular monolith type of support may operate in close coupled relationship to the exhaust manifold; a conventional washcoating may be used to stabilize the monolith for high temperature usage at such location. The filter catalyst should desirably be placed as close as possible to the source of the exhaust stream without damaging the effectiveness of the filter catalyst. In the preferred embodiment, such stationing is within 3–4 inches of the source of the emission stream 19 (location where cylinder exhausts merge as a unitary stream).

The filter catalyst must have a heavy precious metal loading, particularly in the range of 40–60 gm/ft$^3$ of precious metal. The precious metal may be comprised of platinum, palladium or rhodium, in combination or separately, to provide both oxidation and reduction of noxious elements within the emission stream, as is well known. It is important that such filter catalyst be capable of converting only a minor proportion (i.e., 40–60%) of noxious emission elements under heavy engine loading and up to 80–85% under idle conditions); this is brought about by controlling the mass, precious metal loading, size, and space velocity of the filter catalyst.

Such filter catalyst will be capable of eliminating chemical noise because such noise has a high frequency well within the filtering capacity of such a small mass-volume aged or non-aged catalyst. The lowest anticipated chemical noise frequency emitted by the combustion cylinder is about 10 Hz; this is well within the 4 Hz filtering capacity of such catalyst. The conversion capability of such a new filter catalyst goes somewhat beyond removing random combustion effects for chemical noise because the filter catalyst design must allow for the inevitable aging degradation of the catalyst.

If the filter catalyst were designed to initially achieve greater conversion efficiencies than here specified, the response time of the entire feedback control system and sensor would be detrimentally affected because the control loop would be damped; a more damped and slower control loop frequency (limit cycle frequency) would permit larger A/F ratio excursions with resulting catalyst efficiency loss. Limit cycle frequency is the inverse of time taken to complete a rich to lean and back to rich control cycle. Limit cycle frequency is determined by the collective delays in the control loop and includes sensor response, gas transport delay, emission control electronics delays, and software algorithm delays.

Sensor

The essential characteristics required of a sensor to cooperate in the combination invention herein includes at least the basic Nernst-type electrochemical cell, often referred to as a switching exhaust gas oxygen sensor. Although this basic building block of the sensor is necessary, it is important that the final sensor not be of the switching type or step function, but include the refinements set forth herein.

Application of sensors in the control of engine A/F ratio throughout the 1970's and 1980's have been essentially of the switchpoint type. These voltaic type $ZrO_2$ switchpoint sensors have been widely used [sometimes referred to as oxygen sensor, EGO (exhaust gas oxygen) sensor HEGO (heated exhaust gas oxygen) sensor, electrochemical cell, lambda sensor, and fuel cell]. These sensors actually measure the partial pressure of oxygen in the exhaust produced by an engine; engine-out oxygen concentration is related to engine A/F ratio. When engine-out oxygen is measured with a gas analyzer, there is no unique relationship between oxygen concentration and A/F ratio, especially at A/F ratio's near the stoichiometric ratio. It is use of catalytic materials in the sensor that promotes an equilibrated oxygen detection. However, the space velocity at a small sensor electrode is so great that little equilibration takes place in real engine operation. These sensors switch at stoichiometry, as predicted by the Nernst equation, only at full equilibrated, stabilized, high temperature operation. Unfortunately, these conditions are never or rarely present in real engine operation as numerous SAE papers and patents indicate.

The limitations of switchpoint oxygen sensors are: (a) their inability to accurately determine A/F ratio at accuracies greater than 1% and undesirable sensor response time as well as switching time; and (b) cannot measure transient deviations of A/F ratio close to stoichiometry resulting from such things as throttle movements or transmission shifts, without an increase in tailpipe emissions. Sensor response time is the time required for a sensor to establish equilibrium exhaust gas conditions at the electrode/electrolyte interface after a gas transition zone passes the sensor. Switching time is that time after a sensor takes to switch its voltage after establishment of gas equilibrium conditions at the interface. The two response time are frequently added together and described as the sensor response time. The response behavior of the switchpoint sensor is complex and causes off-target adjustments. The voltage output of such sensor will wildly swing for each chemical variation occurring many times per second. These wild swings are usually filtered out by software in the microprocessor to swing once or twice per second. The microprocessor will transfer a signal to the fuel injector that is graduated at each swing but in the same direction as the voltage deviation. This results in a modification to the exhaust gas which compounds the chemical deviations with said slight reduction of the voltage peaks. Certain of the inadequacies is more fully discussed in U.S. Pat. Nos. 4,251,990 and 4,272,329.

To overcome these limitations, the art has tried different arrangements such as numerous combinations of cell design arrangements, alternate up and downstream placement of sensor location, or forced use of algorithms. Location alone has not been able to solve the drift of the switchpoint sensor. Such attempts have not been able to improve "real time" feedback, but complicate the control system in return for a very small improvement in aging drift control.

Figure 2:
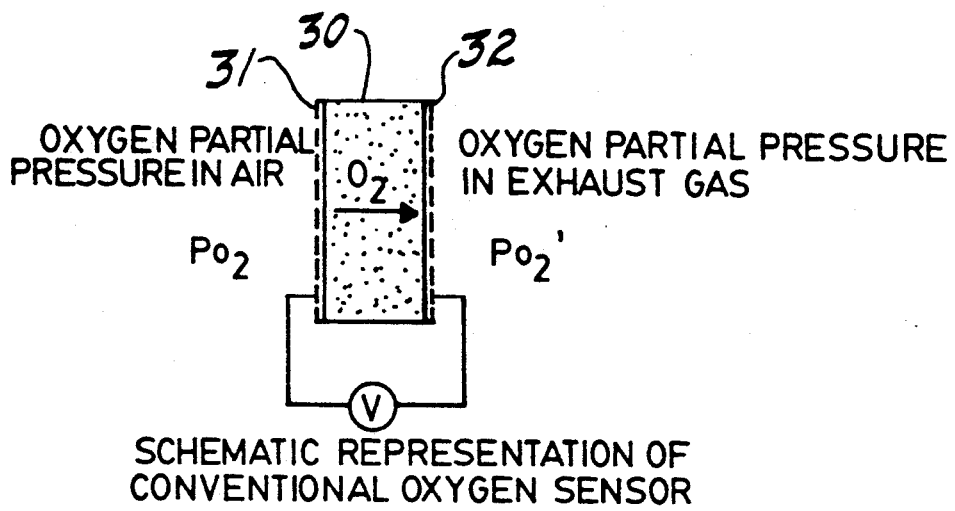
FIG. 2 is a schematic representation of a conventional switchpoint oxygen sensor (prior art)
Figure 3:
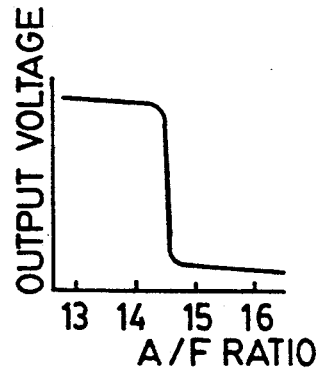
FIG. 3 is a plot of output voltage as a function of A/F ratio for the switchpoint oxygen sensor of FIG. 2.

The Nernst-type electrochemical cell includes (as shown in FIG. 2) a solid electrolyte 30 typically comprised of partially stabilized zirconia, which conducts oxygen ions between electrodes 31, 32 (usually platinum) on its opposite sides with electrode 31 exposed to air and the other electrode 32 exposed to exhaust gas. The electrodes are coated with protective spinel layers and these layers contribute to the sensor response slowness and complexity. An electromotive force (emf) is developed due to the difference in oxygen partial pressure in each of the air and exhaust gas. The voltage output V changes sharply at stoichiometric levels (an A/F ratio of 14.7), as shown in FIG. 3. Such switchpoint type of exhaust gas sensor can only indicate when stoichiometry has been achieved, but it cannot tell you how lean or rich the A/F ratio is at any one point. Thus, even if such type of sensor were to be linearized, its basic function prevents it from achieving needed improvements in system control.

Figure 5:
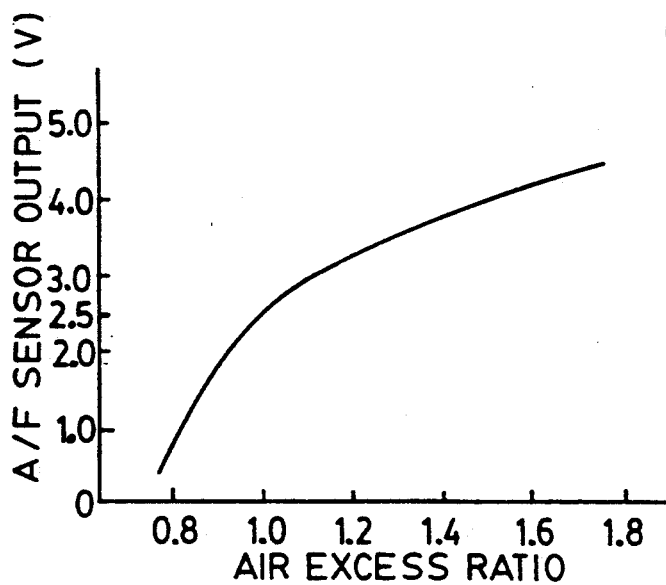
FIG. 5 is a plot of A/F sensor output as a function of air excess ratio for the sensor of FIG. 4.
Figure 4:
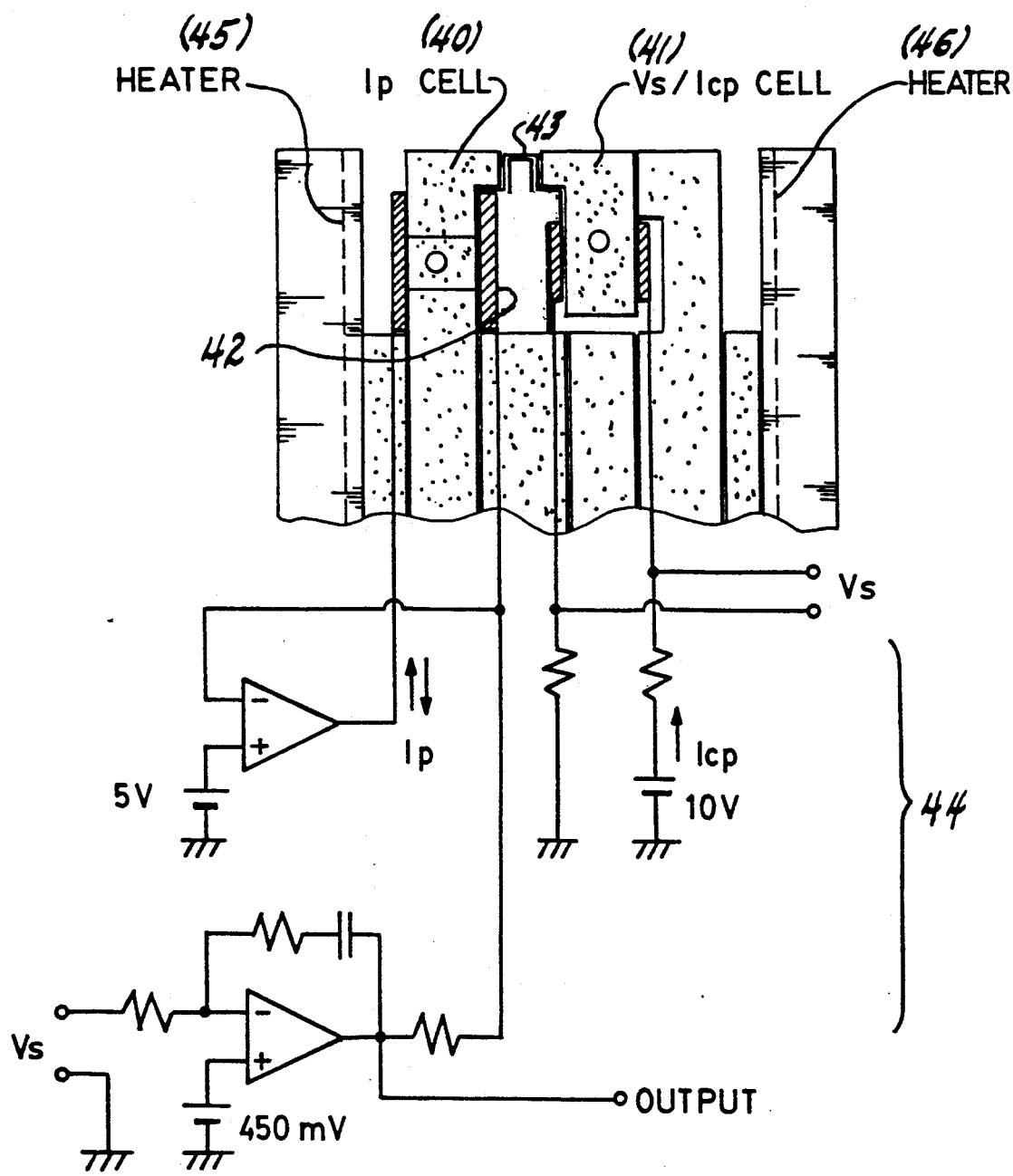
FIG. 4 is a schematic diagram of a universal exhaust gas oxygen sensor useful in the apparatus and method of this invention.

To eliminate this switchpoint characteristic, the sensor required for this invention (as shown in FIG. 4) includes the additional elements of: (a) dual cells 40, 41 (41 being the conventional Nernst-type sensing cell, and 40 being a pumping cell exhibiting a pumping current proportional to the A/F ratio); (b) a diffusion layer 43 (preferably supported on a plug) imposed between the two cells forms an aperture to control the quantity of oxygen molecules which arrive at the cavity between the cells while leaving the electrodes 42 with no cating or covering [the aperture of this diffusion layer may be closed by a special porous diffusion layer to again control the steady arrival of oxygen molecules devoid of contamination effects]; (c) a reversing circuit 44 to pump oxygen into a restricted volume between the two cells both during rich exhaust gas conditions and oxygen out of such restricted volume during lean exhaust gas conditions. This reversing circuit tends to maintain a stoichiometric mixture within the restricted volume between the cells. Thus, variation in time delays are avoided. Variability due to temperature conditions of the air or exhaust gas is eliminated by deploying embedded heater elements 45, 46 in ceramic elements separated but placed exterior to the two cells 40, 41, as shown in FIG. 4. Temperature effects are minimized by the dual cell arrangement. The platinum electrodes are preferably uncovered to improve sensor response behavior with no spinel layers. The output voltage of such a universal or wide-range exhaust gas sensor will be as that shown in FIG. 5. When the air excess ratio is unity (lambda = 1), pumping cell current is zero. The range of detected air excess ratio can be designed into the external electronics. Such a sensor construction is multiple-celled, wide-ranged, linearized, and has a response time of less than 60 milliseconds (response time is 63% of the total response of A/F change). This construction provides improved sensing and control of engine A/F ratio and thus emissions by providing the following specific capabilities which cannot be attained with present switchpoint sensors: (a) measurement of all A/F ratios that are encountered in engine operation; (b) high accuracy measurement of A/F ratio away from stoichiometry; (c) a faster response to sense A/F ratio changes; (d) a more stable and symmetrical response behavior to rich to lean and lean to rich A/F ratio changes; (e) less sensitivity to exhaust temperature changes; and (f) more flexibility to design variations in desired response time characteristics.

The sensing element cells have a low mass of less than five grams and the sensor provides ±3% accuracy (of operating point) at lambdas of 0.7 and 1.4 with increasing accuracy toward lambda of 1 where it will be no more than ±0.07%.

Interactive Controls

The filter catalyst, sensor, and fuel injector must be interrelated to achieve a fast response time by selecting the closed loop gain (multiplying factor used on the sensor signal to apply adjustment power to the A/F ratio controller or fuel injector) and limit cycle frequency. The limit cycle frequency of the feedback control loop should be 3 Hz or greater and the gain set 20% below normal to permit compensation for variability in the equipment and aging of precious metal. Variability is used herein to mean variations within the fuel injector from engine to engine, variations in the sensor from system to system, and variations in air intake within the engine from cylinder to cylinder, and variation of burn rate within a single engine cylinder. Aging is used herein to mean the poisoning or sintering of precious metals on the catalyst with the expiration of time. The gain and phase shift is shaped (i.e., by manipulating the capacitance and diffusion coefficient of the UEGO sensor) to make the sensor work with filter catalyst.

The simplest interaction is to connect the sensor to the fuel injector in a direct proportional closed loop feedback while ensuring that the filter catalyst is sized and matched to the response of the sensor to provide only filtering (eliminate chemical noise) and convert a minor proportion of the noxious elements within the exhaust gas. Proportional means a continuous linear relation between output and input.

It is, however, desirable that the primary feedback loop provide a proportional-integral (PI) control method, similar to a part of the controller described in the SAE technical publication by J. Ishii, M. Amano, T. Yamauchi, N. Kurihara, entitled "Wide-Range Air-Fuel Ratio Control System", Feb. 29, 1988 (SAE publication 880134) on in U.S. Pat. No. 3,939,654.

Independent algorithms, whether proportional or integral, are used as loop gain coefficients in the control. The algorithms are dependent to sensor output behavior. The proportional control algorithm acts in direct opposite and proportional direction to sensed A/F ratio of the UEGO sensor. The integral control algorithm integrates the A/F level for a period and acts to correct the mean A/F level for control system load, such as vapor purge load. Thus, proportional plus integral has the output proportional to a linear combination of the input and the time integral of the input. A typical PI algorithm would be:

$$\frac{Y}{X} = \pm P \frac{\frac{I}{S} + 1}{\frac{bI}{S} + 1} \quad 0 \leq b << 1$$

where
b = proportional gain/static gain
I = integral action rate
P = proportional gain
S = complex variable
X = input transform
Y = output transform Only P or PI control is necessary for this inventive control system. Thus, if the exhaust gas is in the rich region, the logic of the control method increases lambda, and if the exhaust gas is in the lean region, it will decrease lambda. In the closed loop arrangement (shown in FIG. 6), injector power will be influenced by airflow and lambda as modified by injector coefficient $K_i$. PI feedback control is important because when used with a linear output UEGO sensor, the control algorithm will allow A/F ratio to stay at stoichiometry. Prior art algorithms do not allow this.

To further improve the accuracy of A/F ratio control, an adaptive feedback loop may be further incorporated in addition to the primary feedback loop to provide corrections to the injector and open loop sensor coefficients for various airflow/speed combinations.

The injector power is modified by open loop (feed forward) information obtained from temperature, speed of the engine, and engine load.

To compensate for aging of the system, the gain setting for the feedback loop must be arranged so that it is about 15-25% below that predetermined to normally amplify the expected signals received from the filter catalyst, taking into account the designed mass and size of such filter catalyst. Thus, when the filter catalyst is fresh, the millisecond amplitude variations in the A/F mixture entering the filter catalyst will be subdued upon exiting from such catalyst resulting from the elimination of chemical noise. The amplitude of such variations prior to passing the exhaust gas sensor will be subdued to normal and transient excursions. The sensor will then, with its quick response (0.060 of a second phase shift), transmit a highly accurate voltage corresponding to the sensed amplitude, and the microprocessor will convert the voltage signal to an opposite value which changes the injector power function causing the A/F mixture being delivered to the filter catalyst to have reduced variation. The main three-way catalyst will then be more effective in converting the remainder of the noxious elements when the A/F ratio is relatively close to stoichiometry resulting in the final variation which almost assumes a straight line.

When the filter catalyst is substantially aged, such as will occur at vehicle miles above 50,000, the amplitude of the A/F ratio will have exaggerated swings due to the inability of the filter catalyst to dampen such amplitudes and eliminate some of the chemical noise to the same degree as when fresh. The larger A/F ratio swings that occur past an aged filter catalyst act to increase feedback loop gain, thus increasing sensitivity. Also, the sensor will have, during the same time period, experienced some degradation which means that it will detect a lesser amount of the A/F ratio change. The degradation of the sensor acts to decrease the feedback loop gain to a lesser extent. Overall, the combined catalyst-sensor interaction will increase feedback loop gain with aging thereby causing more rapid correction of A/F ratio deviations. An aged catalyst requires higher frequency and lower magnitude A/F ratio excursions to maintain high conversion efficiency.

As shown in FIG. 7a, $O_2$ rises very rapidly in excess of stoichiometry, but the conversion efficiency peaks at stoichiometry (see FIG. 7b), such peaks being lower for the filter catalyst at high load than at idle, lower peaks for an aged catalyst compared to a fresh catalyst and lower peaks for a filter catalyst relative to a main catalyst. The variation in sensed $O_2$ will be less the closer to stoichiometry (FIG. 7c). The correction gain of the aged filter catalyst is stronger than a fresh catalyst (7d).

Thus, the closer the emission gas is to stoichiometry, the more it will be converted and the less will be oxygen variations; the feedback correction gain in the microprocessor is less the closer the gas is to stoichiometry, but is increased by aging as a result of the increase in amplitude of unfiltered chemical constituents (FIG. 7E).

Utilization of the system of this invention can achieve, if not approach more closely, the anticipated federally mandated emissions for the year 2003.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A system for cleansing the gaseous emission stream generated by the combustion of an A/F mixture within cylinders of an internal combustion engine, comprising:
   (a) a low mass, three-way filter catalyst stationed close to the source of said stream effective to affect substantially the entire emission stream by filtering out random combustion effects within said stream, said filter catalyst being limited in conversion efficiency to less than that of the main catalyst of (b);
   (b) a high mass, three-way main catalyst stationed downstream of said filter catalyst effective to convert the remainder of noxious emissions in said stream to desired levels;
   (c) a continuous universal exhaust gas oxygen sensor stationed in said stream between said catalysts effective to symmetrically and accurately indicate the level of oxygen within the stream leaving the filter catalyst within a time response period of less than 60 milliseconds; and
   (d) proportional control means for adjusting in closed loop the A/F ratio of said mixture in interactive response to a deviation of the sensed oxygen level from a target level.

2. The system as in claim 1, in which the size and conversion efficiency of said filter catalyst is arranged to filter more chemical noise the more the A/F mixture approaches stoichiometry.

3. The system as in claim 1, in which said filter catalyst is close coupled to the source of said emission stream and is effective to operate as a light-off catalyst.

4. The system as in claim 1, in which said filter catalyst has a volume of less than 20 in$^3$, and is loaded with precious metal in the range of 40-60 grams per cubic foot.

5. The system as in claim 1, in which said filter catalyst is sized to have a length of about 2-4 inches and is separated from the source of the stream of said exhaust gas emissions by a distance of about 1-4 inches.

6. The system as in claim 1, in which said filter catalyst is effective to convert no greater than 80-85% of said emission stream at engine idle and at a space velocity of about 20K/hr.

7. The system as in claim 6, in which said filter catalyst is capable of converting about 40-60% of the noxious chemical elements of said exhaust gas under non-idle conditions of said engine and has a volume no greater than 20 cubic inches.

8. The system as in claim 7, in which said filter catalyst is operated under load at a space velocity of at least 350K/hr.

9. The system as in claim 1, in which said main catalyst has a mass substantially greater than said filter catalyst and is loaded with precious metal in an amount no greater than 40 gm/ft$^3$.

10. The system as in claim 1, in which said main catalyst is is stationed downstream from said filter catalyst a distance in the range of 1-6 inches.

11. The system as in claim 1, in which said sensor is interactively related to said filter catalyst to eliminate chemical noise, to eliminate slow sensor response, and to compensate for aging of said filter catalyst or sensor.

12. The system as in claim 1, in which said sensor has a response time of less than 60 milliseconds.

13. The system as in claim 1, in which said sensor is substantially temperature insensitive while maintaining high accuracy.

14. The system as in claim 1, in which said sensor is stationed closely adjacent the exit of said filter catalyst.

15. The system as in claim 14, in which said stationing of the sensor is within the range of 1-4 inches from said filter catalyst.

16. The system as in claim 1, in which said sensor is effective to provide a linearized voltage output that provides for control of lambda for said A/F mixture within ±3.0% at lambdas of 0.7-1.4, with increasing accuracy toward lambda of 1, where said control of stoichiometry will have an accuracy of at least ±0.02 A/F.

17. The system as in claim 1, in which said sensor is effective to transmit a signal to said fuel injector within a time period of less than 60 milliseconds.

18. The system as in claim 1, in which said loop gain has a preset gain within the range of 15-25% lower than that predetermined to normally function with the filter catalyst.

19. The system as in claim 1, in which said sensor is comprised of: a Nernst-type electrochemical cell, a pumping cell, a reference chamber to which oxygen diffuses thereinto through a controlled channel (said chamber being adjacent the cathode of each of said cells), a reversing circuit to pump oxygen into said chamber during rich exhaust gas conditions and out of such chamber during lean exhaust gas conditions thereby to maintain a stoichiometric mixture within such chamber, and an external heater to eliminate ambient temperature influences.

20. An engine-catalyst control loop for cleansing the emission stream from said engine, comprising:
   (a) a main catalyst;
   (b) a filter starter catalyst upstream of said main catalyst and close coupled to the source of said exhaust stream, said filter starter catalyst extending across substantially the entire cross-section of said exhaust stream;

(c) a linear multiple-cell exhaust gas sensor positioned to sense the oxygen level of said stream intermediate said catalyst, said sensor having a symmetrical response and a response time less than 60 milliseconds;

(d) controller means for adjustably introducing fuel and air as a mixture into said engine; and (e) electronic means for interactively connecting the output of said sensor with said controller means in a closed feedback loop, said electronic means being effective to provide at least proportional control of the A/F ratio with respect to said sensor output and can maintain the A/F ratio for said engine consistently at stoichiometry within an accuracy range of ±0.01–0.02% A/F.

21. The control as in claim 20, in which said electronic means is effective to provide proportional control with a limit cycle frequency of greater than 3 Hz.

22. The control as in claim 20, in which said electronic means has a gain that increases with aging of at least said filter catalyst.

23. The control as in claim 20, in which said electronic means deploys a mathematical algorithm to achieve proportional and integral feedback control.

24. The control as in claim 20, in which said electronic means receives input information with respect to other operating parameters of said engine and performs adaptive corrections to said proportional loop control in response to said parameters.

25. The control as in claim 20, in which said sensor has three or more cells.

26. A method of compensating for chemical aging of a catalyst system used to cleanse, to a desired level, gaseous emissions from the combustion of an A/F mixture in cylinders of an internal combustion engine, said system being comprised of two in-line complementary loaded catalysts and a wide-range universal exhaust gas oxygen sensor interposed between such catalysts, the upstream catalyst being loaded to effect limited conversion of said noxious emissions and to filter out random combustion effects from the contents of said emissions, and an A/F controller interactively connected to the output voltage of said sensor in a closed loop feedback relationship to control the A/F mixture at or about stoichiometry within a desired accuracy range, the steps comprising:

(a) empirically establishing the chemical degradation rate of said upstream catalyst with a predetermined type of usage that reduces conversion efficiency and permits greater gaseous noxious emissions to pass therethrough;

(b) empirically establishing the degradation rate of said sensor with normal usage reduces the gain of the sensor; and (c) establishing an initial characteristic for the interactive closed loop feedback that will increase in proportion to the empirically established rate of degradation of said upstream catalyst to offset any loss in sensitivity for said sensor as it degrades to maintain a substantially uniform level of conversion of the gaseous emissions from the downstream catalyst.

27. The method as in claim 20, in which said sensor is set to have a higher frequency response capability than for maximum efficiency of the filter catalyst.

28. The method as in claim 26, in which said closed loop feedback relationship has a response frequency of 3–6 Hz.

29. The method as in claim 26, in which in step (c) the gain of said feedback control loop is set 20% below that needed for normal sensing.

30. The method as in claim 26, in which said sensor is constructed to have a built-in gain that provides for an initial frequency response that is higher than needed for said catalyst aged to use over 75,000 vehicle miles.

31. The method as in claim 26, in which said upstream catalyst internally mixes said exhaust stream and provides only 10–20% of the total catalyst volume.

* * * * *